Nov. 29, 1949 — E. E. NORELIUS — 2,489,974
FISHING APPARATUS
Filed March 30, 1945 — 2 Sheets-Sheet 1
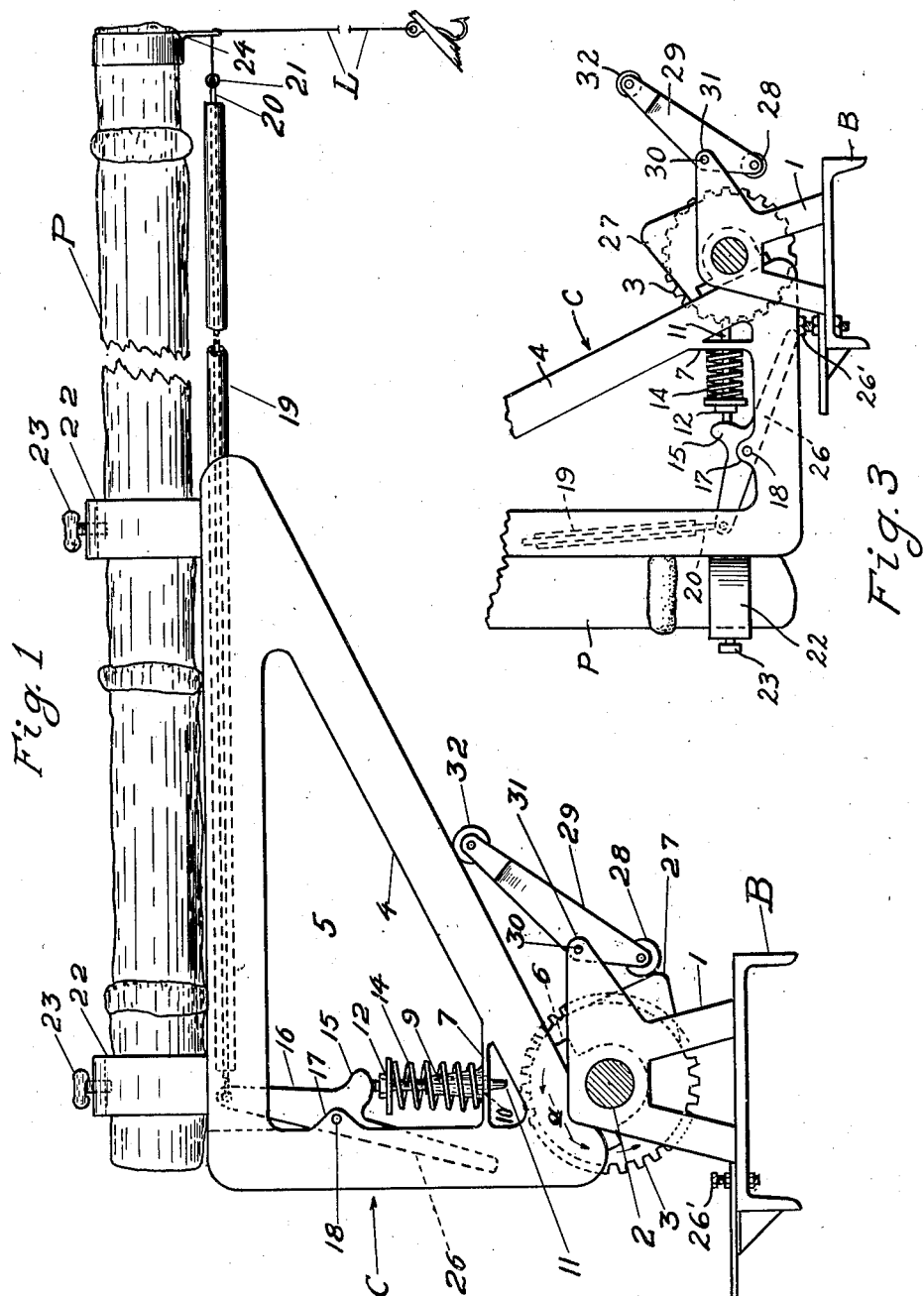
INVENTOR.
E. E. NORELIUS.
BY
ATTORNEY.

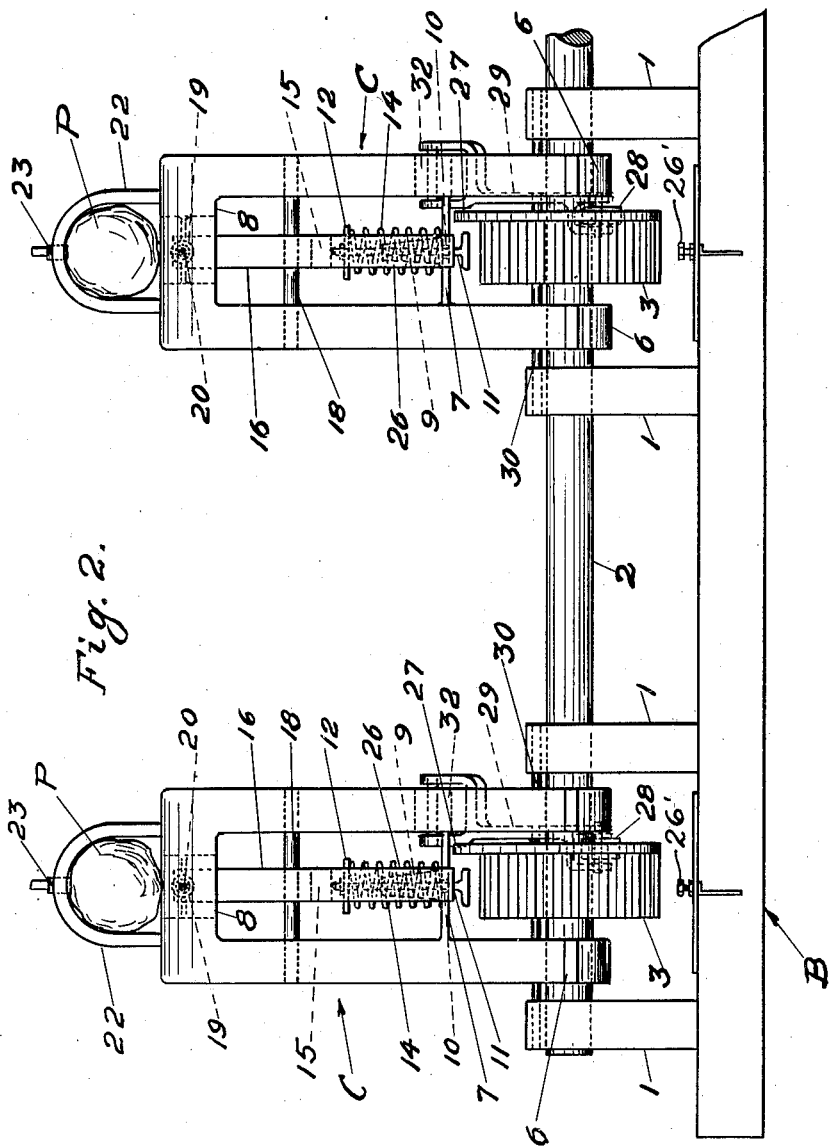

Patented Nov. 29, 1949

2,489,974

UNITED STATES PATENT OFFICE 2,489,974

FISHING APPARATUS

Elim E. Norelius, Seaside, Oreg.

Application March 30, 1945, Serial No. 585,719

7 Claims. (Cl. 43—15)

This invention relates to fishing apparatus and it is primarily an object of the invention to provide an apparatus of this kind comprising a fishing pole, together with means whereby a line-carrying pole is caused to rise upon a fish striking the hook.

It is another object of the invention to provide an apparatus of this kind comprising a plurality of line-carrying poles, together with driven means common to all of the poles to permit the poles to be separately raised upon a fish striking the line carried by such pole.

The invention consists in the details of construction and in the combination and arrangement of the several parts of my improved fishing apparatus whereby certain important advantages are attained, as will be hereinafter more fully set forth.

In order that my invention may be the better understood, I will now proceed to describe the same with reference to the accompanying drawings, wherein:

Figure 1 is a fragmentary view in side elevation of a fishing apparatus constructed in accordance with an embodiment of the invention;

Figure 2 is a fragmentary view in front elevation of the apparatus as herein embodied; and Figure 3 is a fragmentary view illustrating the positions of the parts when the pole reaches its maximum elevated position.

In the embodiment of the invention as illustrated in the accompanying drawings, B denotes a base herein disclosed as of channel formation and which may be operatively supported upon the gunwale of a boat or otherwise as may be desired.

At predetermined points therealong the elongated base member B is provided with the upstanding bearing members 1 which rotatably support a shaft 2 of desired length and as may be determined by the number of poles P desired to be employed.

At desired points spaced therealong the shaft 2 has fixed thereto for rotation therewith the gear wheels 3 of desired dimensions and straddling each of the gear wheels 3 are the side members 4 of a carriage C. This carriage C is in the form of an inverted U in cross section from one end to the other and in side elevation is right triangular in form.

Each of the side members 4 of the carriage C is skeletonized to reduce weight and whereby each of said side members 4 is provided with a relatively large central opening 5. The lower or base portions of the hypotenuse margins of the side members 4 are provided with the bearings 6 whereby the carriage C is mounted upon the shaft 2 for swinging movement thereon to substantially a vertical elevation.

The side members 4 of the carriage C immediately above the bearings 6 have rigidly secured thereto a shelf 7 which bridges the space between the side members 4. This shelf 7 is substantially parallel with the upper or intermediate portion 8 of the carriage C and is provided in its central portion with an upstanding sleeve 9, the bore of which is in register with an opening 10 in the shelf 7. Freely insertible through the sleeve 9 and the opening 10 is a pin 11 provided in its upper portion with an enlargement or head 12.

Interposed between the enlargement or head 12 and the sleeve 9 of the shelf 7 is an expansible member 14 herein disclosed as a coil spring encircling both the sleeve 9 and the pin 11. This member or spring 14 serves to constantly urge the pin 11 upwardly and in contact with the rocker foot 15 carried by and extending forwardly from the lower or pivoted end portion of an upstanding lever 16. This lever 16 extends between the forwardly directed ears 17 carried by the rear portions of the carriage C and extending within the central opening 5 with a pivot member 18 extending through said ears 17 and the lower end portion of the lever 16.

The expansible member or spring 14 also serves to normally maintain the lower end of the pin 11 above and out of contact with the gear wheel 3 which is immediately therebelow. Upon forward pull being imposed upon the lever 16, the foot 15 will contact the pin 11 from above and force the same downwardly into contact with the gear wheel 3 whereby the carriage C will be locked to the gear wheel 3 so that, upon rotation of the gear in the direction indicated by the arrows a, the carriage C and the pole P mounted thereon will be swung upwardly. This shaft 2 is continuously rotated by any suitable means coupled thereto.

The intermediate portion 8 of the carriage C at substantially the transverse center thereof carries an underlying guide tube 19 which extends lengthwise of said base 8 and has freely disposed therethrough a flexible pole member 20. One end portion of this member 20 is tied to the upper end portion of the lever 16 while the opposite end portion is provided with a loop 21 or the like to which an end of a fishing line L may be connected.

The butt portion of the pole P rests upon the base 8 of the carriage C and, as herein disclosed, is disposed through the upstanding rings 22 carrying the clamping screws 23 whereby the pole P is effectively held to the carriage C.

The pole P is of any length desired and the outer extremity thereof is provided with the usual guide eye 24 through which the line L passes.

In practice, when a fish strikes the hook 25 of the line L, the resultant pull upon the lever 16 will move the pin 11 into locking engagement with the gear wheel 3, whereby, under the action of the driven shaft 2, the pole P will be swung upwardly. After the carriage C, together with the pole P, has been swung upwardly beyond the vertical center, the captured fish will be brought aboard the boat and as soon as the line L is relieved of its load, the pin 11 will be thrown outwardly into released position.

If, after a fish strikes and before the carriage C passes the vertical center, the captured fish should become free, the member or spring 14 will immediately move out into released position and the pole P will drop back into fishing position.

The pivoted end portion of the lever 16 is provided with the relatively long arm 26 which, as the carriage C swings upwardly beyond vertical center, will strike the trip pin 26' and oscillate the lever 16 to release the pin 11 from the gear wheel 3, thus disconnecting the carriage C from the gear wheel 3, which continues to rotate.

The gear wheel 3 to one side thereof is provided with an outstanding cam 27 which, upon each revolution of the gear wheel 3, contacts a roller 28 carried by the lower end portion of a rock arm 29. This rock arm 29, at a predetermined point intermediate its length, is mounted by a pin 30 upon and between the forwardly directed arms 31 carried by the adjacent bearing members 1. The upper end portion of this arm 29 carries a roller 32 which contacts the under edge of the hypotenuse of the carriage frame C so that between strikes the pole P will intermittently be caused to rise and fall, giving an up and down surge to the hook 25.

From the foregoing description it is thought to be obvious that a fishing apparatus constructed in accordance with my invention is particularly well adapted for use by reason of the convenience and facility with which it may be assembled and operated.

I claim:

1. A fishing apparatus comprising a shaft designed to be constantly rotated, a carriage mounted on the shaft for rocking movement, coacting means between the carriage and the shaft to couple the carriage to the shaft for rotation with the shaft, means for normally maintaining said means in released position, and a member to which a fishing line is to be attached and operating upon a strike of a fish to effect the actuation of the coacting means for the coupling of the carriage with the shaft.

2. A fishing apparatus comprising a shaft designed to be constantly rotated, a carriage mounted on the shaft for rocking movement, two coacting elements between the carriage and the shaft adapted when coupled together to couple the carriage to the shaft for rotation with the shaft, means for normally maintaining said elements separated, a member to which a fishing line is to be attached and operating upon a strike of a fish to effect the coupling together of the elements, and means for releasing the pin when the carriage swings with the shaft a predetermined distance.

3. A fishing apparatus comprising a shaft designed to be constantly rotated, a carriage freely mounted on the shaft for rocking movement, a circular toothed element mounted on the shaft to rotate therewith, a shiftable pin carried by the carriage to engage between teeth of said element to lock the carriage to the shaft for rotation with the shaft, means for normally maintaining said pin disconnected from the element, a member to which a fishing line is to be attached and operating upon a strike of a fish to shift the pin into connection with the shaft, and means operated from the shaft for intermittently rocking the carriage on the shaft when the carriage is in its lowered position.

4. A fishing device of the character described, comprising a rotatably mounted member designed to be continuously rotated, a frame structure supported for turning movement concentric with said member, means for securing a fishing pole to said frame structure, means for connecting a fishing line with the pole, said frame structure having a down position in which the pole is substantially horizontal and a raised position in which the pole is lifted from the horizontal position, means for intermittently jogging the frame structure when the frame is in the down position, and means carried by the frame structure and adapted to have the fishing line attached thereto for effecting a connection between the frame structure and the rotatable member upon the application of a pull to the fishing line to cause the frame structure and pole to be turned to raised position.

5. A fishing device of the character stated, comprising a rotatably supported member designed to be continuously rotated, a frame supported for turning movement on an axis concentric with the turning axis of the member, a fishing pole connected with the frame, means for connecting a fishing line with the pole, a locking pin shiftably carried by the frame and adapted when shifted in one direction to engage the rotatable member for coupling the frame and member together for simultaneous turning movement, spring means normally urging the pin out of connection with the member, and an oscillatable finger supported upon the frame and operatively coupled with said pin, said finger being adapted to have the fishing line connected therewith to be oscillated upon the application of a pull to the line to effect movement of the pin into engagement with said member.

6. A fishing device of the character stated in claim 5, with a pivotally mounted lever having an end in engagement with the frame when the frame is free of connection with the rotatable member, and means rotatable with said member for intermittently engaging the lever to impart a jogging movement to the frame.

7. A fishing device of the character stated in claim 5, with means adapted to effect the oscillation of said finger upon the turning of the frame with said rotatable member to a predetermined position to effect shifting of the finger and release of the pin from the rotatable member.

ELIM E. NORELIUS.

REFERENCES CITED

The following references are of record in the file of this patent:

UNITED STATES PATENTS

| Number | Name | Date |
|---|---|---|
| 202,962 | Robertson et al. | Apr. 30, 1878 |

FOREIGN PATENTS

| Number | Country | Date |
|---|---|---|
| 280,117 | Germany | Nov. 8, 1913 |